United States Patent [19]
Peterson

[11] Patent Number: 5,122,935
[45] Date of Patent: Jun. 16, 1992

[54] VEHICLE HEADLAMP AND AIMING APPARATUS

[75] Inventor: Francis C. Peterson, Prescott, Wis.

[73] Assignee: Phillips Plastics Corporation, Prescott, Wis.

[21] Appl. No.: 755,876

[22] Filed: Sep. 6, 1991

[51] Int. Cl.⁵ .............................................. B60Q 1/06
[52] U.S. Cl. ...................................... 362/66; 362/421
[58] Field of Search ................... 362/66, 287, 289, 421

[56] References Cited

U.S. PATENT DOCUMENTS

| | | | |
|---|---|---|---|
| 1,142,964 | 6/1915 | Howe | 362/421 X |
| 1,273,994 | 7/1918 | Bohan | 362/289 |
| 1,273,995 | 7/1918 | Bohan | 362/289 |

Primary Examiner—Stephen F. Husar
Attorney, Agent, or Firm—Merchant, Gould, Smith, Edell, Welter & Schmidt

[57] ABSTRACT

A vehicle headlamp assembly with a lamp bulb mounted on a ball for motion within a socket to move the lamp with respect to the reflector permitting aiming adjustment of the headlamp.

1 Claim, 4 Drawing Sheets

VEHICLE HEADLAMP AND AIMING APPARATUS

BACKGROUND OF THE INVENTION

1. Field of the Invention

The present invention relates to headlamps for vehicles, and more particularly to apparatus for aiming a headlamp.

2. Description of the Prior Art

Traditionally, automotive and other vehicular headlamps have been aimed by the adjustment of screws. Typically, the headlamp is mounted in a so called "bucket". The bucket in turn, is mounted to the front of the vehicle with adjusting screws which moves the bucket about pivot points. The screws, in combination with the pivot points permit the relative angular orientation of the headlamp assembly with respect to the road, thus permitting aiming of the headlamp.

U.S. Pat. No. 4,959,758 to Filosa et al shows an assembly mounted to the vehicle by three pivot balls permitting relative adjustment between the vehicle and the lamp assembly.

U.S Pat. No. 4,843,523 teaches a headlamp device having a screw adjustment to move the reflector with respect to the vehicle frame.

U.S. Pat. No. 4,757,428 shows a headlamp assembly with a removable lamp. This assembly is mounted to the vehicle frame with a resilient slot engaging member. This cushion-like device isolates the headlamp assembly and permits aiming adjustment of the assembly.

SUMMARY OF THE INVENTION

In contrast to the prior art, the present invention includes a headlamp assembly which is aimed by moving the headlamp bulb. The bulb, is mounted for relative movement with respect to the headlamp reflector. Aiming adjustment is provided by moving the lamp bulb with respect to the reflector.

DETAILED DESCRIPTION OF THE PREFERRED EMBODIMENT

Figure 1:
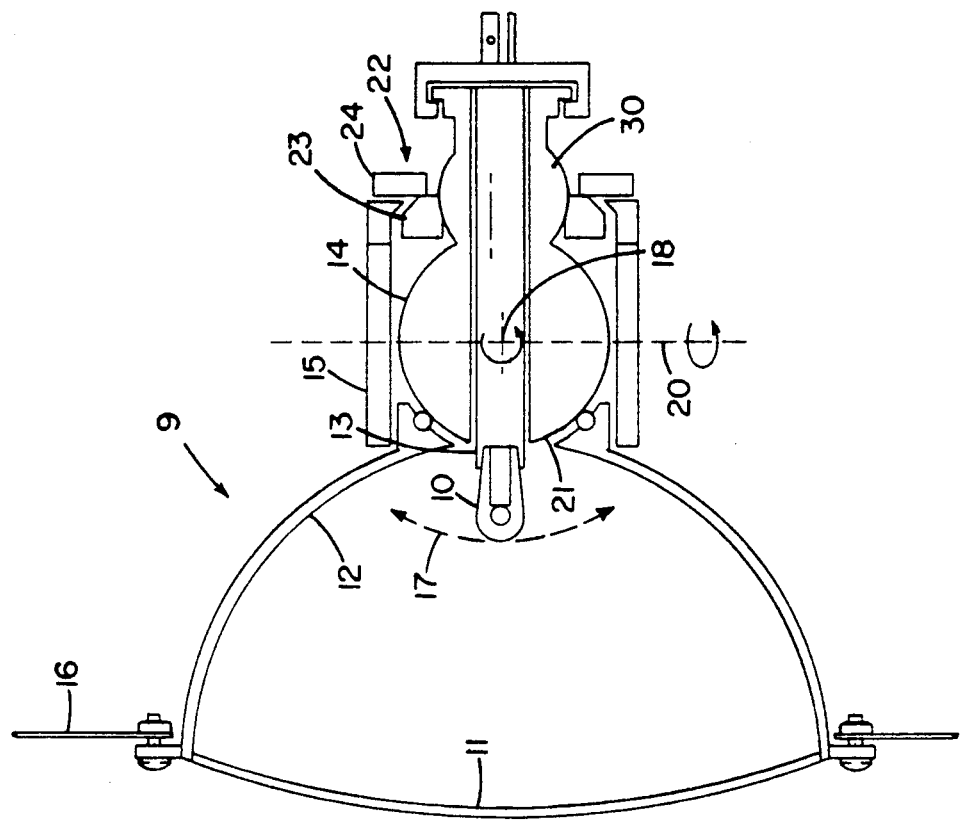
FIG. 1 is a schematic cross-section top view of a first embodiment of a headlamp assembly.

Turning to FIG. 1, there is shown, a headlamp assembly 9 which includes a halogen bulb 10 mounted near the focus of a substantially parabolic reflector 12. In the drawing, the invention is disclosed in the context of a "round" headlamp assembly however it should be understood that the aiming structures are useful in rectangular or other shaped headlamp assemblies. The front of the assembly 9 includes a transparent window or lens 11. Typically the lens 11 will be formed from glass while the reflector 12 may be formed from plastic or glass, with an appropriate reflective coating applied to render the interior surface reflective.

The halogen bulb 10 element is mounted within a suitable bulb holder 13 which is mounted in an adjustment ball 14. The adjustment ball 14 is mounted in a holder socket 15 which is attached to the reflector 12. The assembly 9 may be connected to the vehicle by attaching the reflector to the vehicle through a vehicle flange 16. Thus the reflector 12 is stationary with respect to the vehicle flange 16 while the bulb 10 is free to move within the reflector 12, constrained by the adjustment ball 14, moving in the socket 15. Typically, a wider range of adjustment is required in this horizontal plane as opposed to the vertical plane. In each of the embodiments presented here is it is preferred to dedicate the widest range of motion to the horizontal or left-to-right adjustment, while the narrower range of adjustment is used for the vertical plane or up-down adjustment. It should be apparent to one of skill in the art that the headlamp assembly can be rotated should the particular application warrant greater adjustability in alternate planes.

In each embodiment the adjustment ball, 14 may be rotated to position the halogen bulb 10 with respect to the reflector 12. In FIG. 1, the axis of vertical rotation is shown by axis 18, while the path of the bulb 10 in the vertical plane is shown as dotted path 17. Aiming adjustment in this vertical plane is accomplished by counterclockwise rotation of the bulb holder 13 as indicated by arrow 21. The spherical surface of the adjustment ball 14 also permits rotation of the ball about axis 20. Rotation about this axis 20 causes the bulb to swing from side to side aiming the headlamp left-to-right. Thus, each of the aiming adjustments is made by moving the bulb 10 with respect to the reflector 12.

Figure 2:
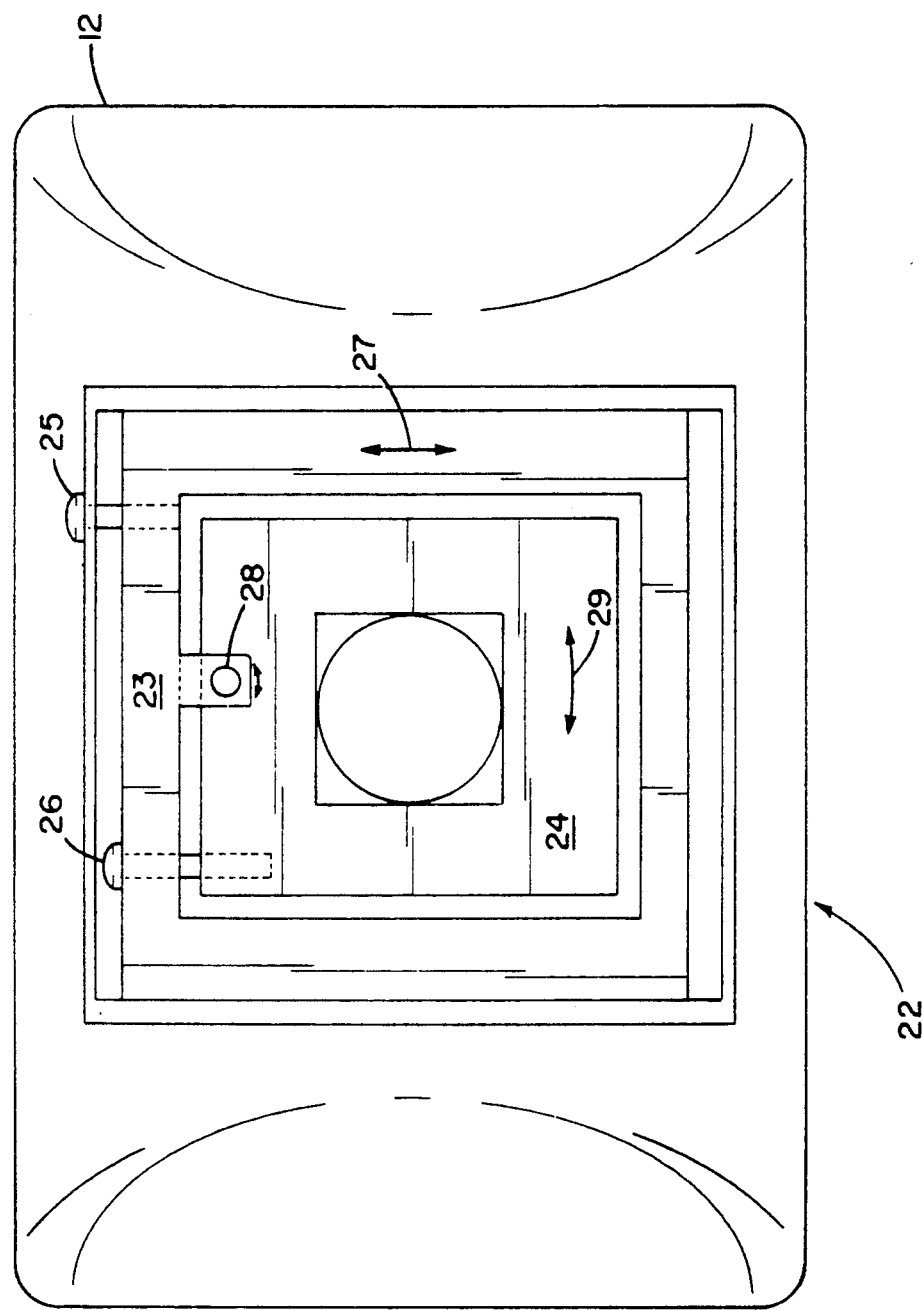
FIG. 2 is a rear view of the headlamp assembly of FIG. 1.

The adjustment ball 14 is rotated by a slide assembly 22, which operates on an aiming ball 30. The aiming ball 30 is preferably formed as an integral part with the adjustment ball 14. Turning to FIG. 2, there is shown a rear view of slide assembly 22. The assembly includes a vertical slide 23 and a lateral pivot slide 24. These slides are moved by a pair of adjustment screws 25 and 26. Vertical slide 23 is positioned by screw 25, and rotation of the screw causes the slide 23 to move along path 27. In a similar fashion, adjustment screw 26 causes the lateral pivot slide 24 to rotate around pivot point 28, thus impressing a substantially longitudinal motion along the path identified in FIG. 2 as path 29. Adjustment of the screws 25 and 26 permits the halogen bulb 10 to be moved with respect to the reflector 12 housing to permit the bulb 10 to be aimed.

Figure 3:
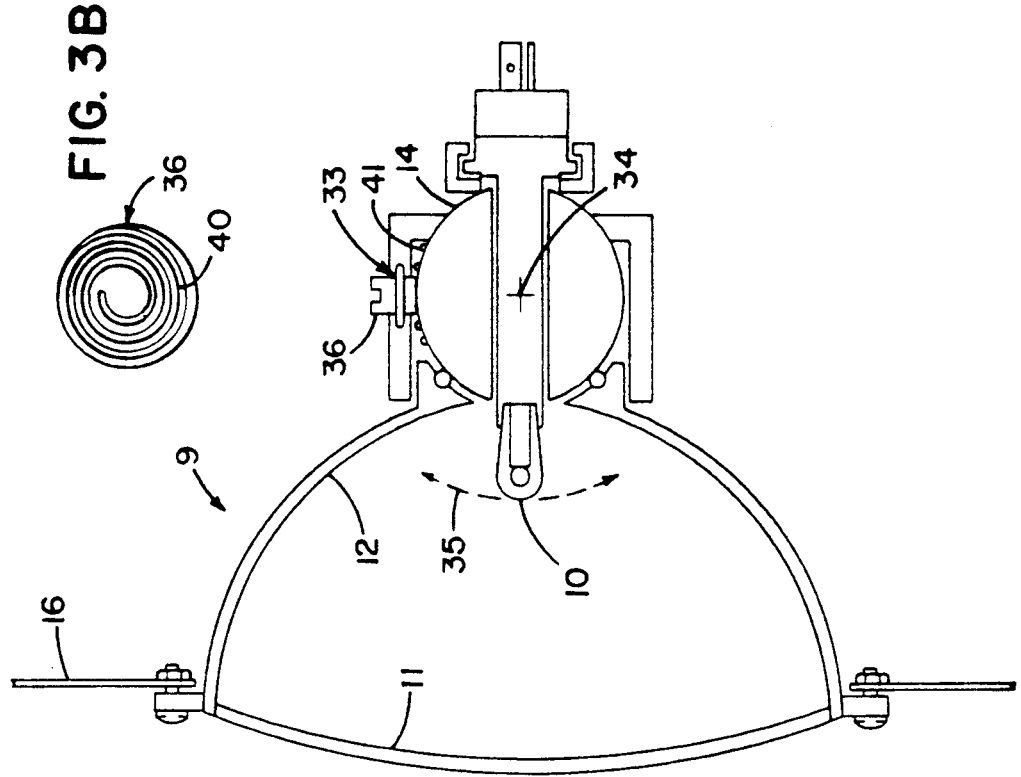
FIG. 3A is a view of an alternative embodiment of the headlamp structure as seen from the side.
FIG. 3B is a detail of the lower surface of the up-/down adjustment screw of the FIG. 3 embodiment.
Figure 4:
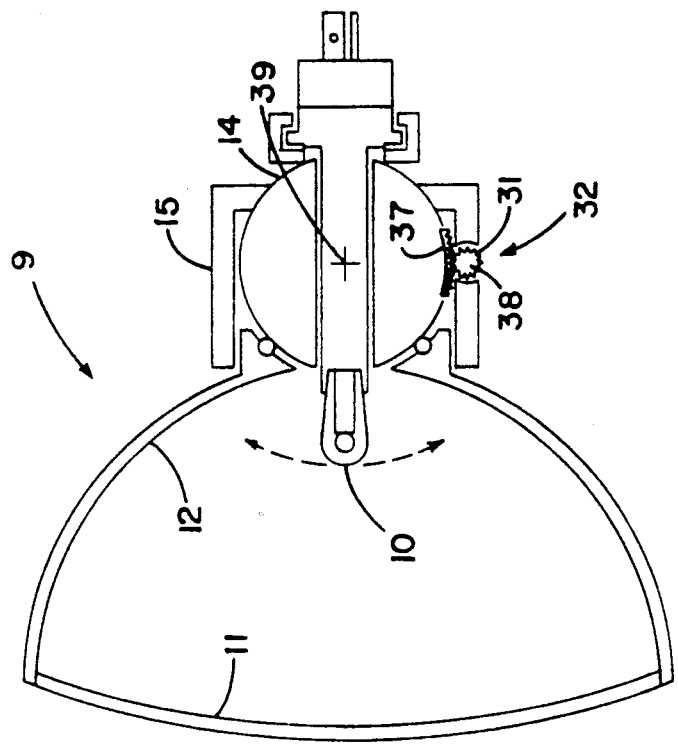
FIG. 4 is a top view of the headlamp assembly of FIG. 3.

An alternative embodiment is depicted in FIGS. 3A, 3B and FIG. 4. FIG. 3A is a side view, and FIG. 4 is a top view of the headlamp structure.

In this embodiment, the adjustment ball 14 may be rotated by a rack and pinion assembly generally designated 32 in FIG. 4 and a worm and peg assembly generally designated 33 in FIG. 3A. The rack pinion assembly 32 provides the wide range of motion required for left-to-right or lateral adjustment. The worm and peg assembly 33 provides a more limited range of adjustment and is preferably used for up-down adjustment.

FIG. 3A shows a side view of the headlamp assembly 9, in which the worm and peg assembly 33 is used to rotate the adjustment ball 14 about axis 34. Rotation of adjustment ball 14 about axis 34 causes the bulb 10 to move in the arcuate path 35 providing vertical aiming of the assembly 9. The worm is formed as a part of the adjustment screw 36, and is depicted in the detail of FIG. 3B. The worm structure is preferably a spiral worm groove cut into the lower surface of the adjustment screw 36.

The peg portion of the assembly is preferably formed as a plurality of rounded teeth or pegs 41 formed as a unitary piece of the adjustment ball 14. Depending on the angular position of the adjustment ball one or more pegs 41 will engage the worm groove 40 in the adjustment screw 36. Rotation of this captive screw 36 will cause rotation about axis 34.

The rack portion 37 of the rack and pinion assembly 32 is a attached to the adjustment ball 14, and is best seen in the view of FIG. 4. Rotation of the pinion gear 31 is accomplished by application of torque to the slotted screw head 38 of the pinion gear 31. Rotation of the pinion gear 31 causes rotation of the adjustment ball about axis 39.

Thus the headlamp may be aimed in the vertical plane by rotation of screw 36, and in the horizontal plane by screw 38.

Although two embodiments of the invention have been shown to illustrate the invention it should be clear that many other modifications may be made to the structure of the invention without departing from the scope of the invention.

I claim:

1. Vehicular headlamp assembly for attachment to a vehicular frame, comprising:
   a reflector, having a focal point;
   a socket attached to said reflector;
   an adjustment ball located within said socket, mounted for rotation about a first axis with respect to said reflector, and mounted for rotation about a second axis, with respect to said reflector;
   a lamp bulb located proximate said focus attached to said adjustment ball;
   first adjustment means coupled to said adjustment ball for rotating said ball about said first axis;
   second adjustment means coupled to said adjustment ball for rotating said adjustment ball about said second axis;
   whereby said first and second adjustment means may be actuated to position said bulb with respect to said reflector to aim said headlamp assembly.

* * * * *

UNITED STATES PATENT AND TRADEMARK OFFICE
CERTIFICATE OF CORRECTION

PATENT NO.  : 5,122,935
DATED       : June 16, 1992
INVENTOR(S) : Francis C. Peterson It is certified that error appears in the above-indentified patent and that said Letters Patent is hereby corrected as shown below:

Col. 1, line 38, before the word "bulb" delete —lamp—
        line 39, after the word "reflector" delete —.—
        line 39, after the word "reflector", insert —with adjusting screws.—
        line 53, delete the word "EMBODIMENT" and substitute therefore —EMBODIMENTS—

Col. 2, line 11, after the word "here", delete —is—
        linr 56, before the word "pinion", insert —and—

Col. 3, line 11, before the word "attached", delete —a—

Signed and Sealed this

Twelfth Day of October, 1993

Attest:

BRUCE LEHMAN

*Attesting Officer*  *Commissioner of Patents and Trademarks*